United States Patent
Cui et al.

(10) Patent No.: US 11,219,919 B1
(45) Date of Patent: Jan. 11, 2022

(54) ELECTROSTATICALLY DRIVEN ASSEMBLY OF NANOPARTICLE MATERIALS INTO DENSE FILMS

(71) Applicant: HRL Laboratories, LLC, Malibu, CA (US)

(72) Inventors: Shanying Cui, Calabasas, CA (US); Adam F. Gross, Santa Monica, CA (US); Florian G. Herrault, Agoura Hills, CA (US)

(73) Assignee: HRL Laboratories, LLC, Malibu, CA (US)

( * ) Notice: Subject to any disclaimer, the term of this patent is extended or adjusted under 35 U.S.C. 154(b) by 291 days.

(21) Appl. No.: 15/795,346

(22) Filed: Oct. 27, 2017

Related U.S. Application Data

(63) Continuation-in-part of application No. 15/241,536, filed on Aug. 19, 2016, now Pat. No. 10,189,718.

(60) Provisional application No. 62/418,194, filed on Nov. 6, 2016.

(51) Int. Cl.
    *B05D 1/00* (2006.01)
    *H01F 1/11* (2006.01)
(52) U.S. Cl.
    CPC .............. *B05D 1/007* (2013.01); *H01F 1/11* (2013.01)
(58) Field of Classification Search
    USPC ........................................................ 427/169
    See application file for complete search history.

(56) References Cited

U.S. PATENT DOCUMENTS

| | | | |
|---|---|---|---|
| 5,534,461 | A | 7/1996 | Kuwajima |
| 5,591,535 | A | 1/1997 | Hisano et al. |
| 6,506,264 | B1 | 7/2003 | Hisano et al. |
| 8,475,869 | B2 | 7/2013 | Badre et al. |
| 9,695,468 | B2 | 7/2017 | Hindson et al. |
| 2003/0022242 | A1 | 1/2003 | Anderson |

(Continued)

OTHER PUBLICATIONS

Barnov et al., "Chemically induced self-assembly of spherical and anisotropic inorganic nanocrystals," J. Mater. Chem. 2011, 21, 16694.

(Continued)

*Primary Examiner* — Mandy C Louie
(74) *Attorney, Agent, or Firm* — O'Connor & Company

(57) ABSTRACT

In some variations, the invention provides a method of depositing nanoparticles on a substrate, comprising: providing a substrate having a positive or negative surface charge; optionally depositing a polymer on the substrate, wherein the polymer has opposite charge polarity compared to the substrate; and simultaneously depositing first nanoparticles and second nanoparticles onto the substrate, wherein the first nanoparticles and the second nanoparticles have opposite charge polarities during depositing. Other variations provide a method of depositing a layer of nanoparticles on a substrate, the method comprising: providing a substrate having a positive or negative surface charge; providing faceted nanoparticles; preparing a nanoparticle solution containing the nanoparticles; and adjusting surface charge of the nanoparticles by changing the solution pH to reduce the magnitude of average zeta potential of the nanoparticles, thereby causing aggregation of the nanoparticles onto the substrate surface. Very high packing densities may be achieved with these methods.

14 Claims, 9 Drawing Sheets

(56) References Cited

U.S. PATENT DOCUMENTS

| | | | |
|---|---|---|---|
| 2005/0009079 A1 | 1/2005 | Anders et al. | |
| 2006/0083694 A1* | 4/2006 | Kodas | C08J 3/203 424/46 |
| 2006/0166249 A1* | 7/2006 | Rothberg | C12Q 1/6816 435/6.18 |
| 2008/0096016 A1* | 4/2008 | Tsurumi | H05K 3/387 428/344 |
| 2008/0193318 A1* | 8/2008 | Carty | B01J 2/006 419/2 |
| 2009/0098366 A1* | 4/2009 | Smoukov | B05D 1/18 428/328 |
| 2009/0297615 A1* | 12/2009 | Wang | B82Y 5/00 424/490 |
| 2011/0286975 A1* | 11/2011 | Souza | B82Y 5/00 424/93.7 |
| 2011/0318267 A1* | 12/2011 | Auguste | A61K 9/5138 424/9.1 |
| 2013/0168228 A1* | 7/2013 | Ozin | B01J 23/08 204/157.9 |
| 2013/0273242 A1* | 10/2013 | Krogman | G02B 3/08 427/164 |

OTHER PUBLICATIONS

Baranov et al., "Assembly of Colloidal Semiconductor Nanorods in Solution by Depletion Attraction," Nano Lett. 2010, 10, 743-749.

Teh et al., "Droplet microfluidics," Lab Chip, 2008, 8, 198-220.

Ahmed et al., "Centimetre scale assembly of vertically aligned and close packed semiconductor nanorods from solution," Chemical Communications, (42): 6421-6423, Sep. 8, 2009.

Fang et al., "pH-Induced Simultaneous Synthesis and Self-Assembly of 3D Layered β-FeOOH Nanorods," Langmuir 2010, 26(4), 2745-2750.

Han et al., "Synthesis and magnetic properties of single-crystalline magnetite nanowires," Journal of Crystal Growth 307 (2007) 483-489.

Singh et al., "Controlled semiconductor nanorod assembly from solution: influence of concentration, charge and solvent nature," J. Mater. Chem., 2012, 22, 1562.

Singh et al., "Insight into the 3D Architecture and Quasicrystal Symmetry of Multilayer Nanorod Assemblies from Moiré Interference Patterns," ACS Nano vol. 6 No. 4 3339-3345, 2012.

Singh et al., "Assembly of CuIn1-xGaxS2 Nanorods into Highly Ordered 2D and 3D Superstructures," ACS Nano vol. 6 No. 8 6977-6983, 2012.

Talapin et al., "A New Approach to Crystallization of CdSe Nanoparticles into Ordered Three-Dimensional Superlattices," Adv. Mater. 2001, 13, No. 24, Dec. 17.

Varanda et al., "Structural and magnetic transformation of monodispersed iron oxide particles in a reducing atmosphere," Journal of Applied Physics vol. 92, No. 4 Aug. 15, 2002.

Vivas et al., "Magnetic anisotropy in ordered textured Co nanowires," Applied Physics Letters 100, 252405 (2012).

Wang et al., "Self-Assembled Colloidal Superparticles from Nanorods," Science Oct. 19, 2012 vol. 338.

Zanella et al., "Self-Assembled Multilayers of Vertically Aligned Semiconductor Nanorods on Device-Scale Areas," Adv. Mater. 2011, 23, 2205-2209.

Zhuang et al., "Cylindrical Superparticles from Semiconductor Nanorods," J. Am. Chem. Soc. 2009, 131, 6084-6085.

Chao et al., "Millimeter Wave Hexagonal Nano-Ferrite Circulator on Silicon CMOS Substrate" Microwave Symposium (IMS), 2014 IEEE MTT-S International.

Kotov et al., "Layer-by-Layer Self-Assembly of Polyelectrolyte-Semiconductor Nanoparticle Composite Films" J. Phys. Chem. 1995, 99, 13065-13069.

* cited by examiner

ELECTROSTATICALLY DRIVEN ASSEMBLY OF NANOPARTICLE MATERIALS INTO DENSE FILMS

PRIORITY DATA

This patent application is a non-provisional application claiming priority to U.S. Provisional Patent App. No. 62/418,194, filed Nov. 6, 2016, which is hereby incorporated by reference herein. This patent application is also a continuation-in-part of U.S. patent application Ser. No. 15/241,536, filed Aug. 19, 2016, which is hereby incorporated by reference herein.

FIELD OF THE INVENTION

The present invention generally relates to magnetic nanoparticles, materials and structures containing magnetic nanoparticles, and methods of fabricating such materials and structures.

BACKGROUND OF THE INVENTION

Tightly packed arrays of nanoparticles are useful for optical, magnetic, and electronic device applications. There are existing approaches for forming packed nanoparticles, employing organic ligands in solution to form assemblies. The presence of organic ligands is problematic because the ligands can melt from heat, darken in the presence of light, and inhibit electrical conductivity.

Nanoparticles may be crystallized from solution. Arrays of nanoparticles from crystallization methods are usually surrounded by organic ligands that interfere with further chemical processing and can limit durability.

Nanoparticles may be formed in an array on a substrate. The nanoparticles may be packed using drying from a solution (colloidal crystals) or electrophoresis. Colloidal crystals are formed by dispersing colloids in a solution and drying on a substrate or spin coating on a substrate. Electrophoresis does not necessarily result in tightly packed nanoparticles. Two-dimensional but not three-dimensional arrays of nanoparticles may be grown in an array on a substrate from a process with gaseous reactants.

Arrays of nanoparticles may be formed through a wet chemical process. In one approach, metals or oxides are deposited in the pores of anodic alumina or mesoporous silica. This approach forms either single layers of nanorods or nanorods that have empty space between them and no material between the rods. This results in a low density of material and reduced efficacy from the array.

Packed arrays of nanoparticles, as taught in the prior art, tend to be non-uniform in array size and shape. In order to be useful in larger devices, arrays of assembled particles should be uniform in size and shape. This is necessary for either bottom-up assembly processes, such as self-assembly into larger assemblies; for top-down assembly processes, such as pick-and-place assembly onto patterned substrates; or for combinations of bottom-up and top-down assembly.

Integrated microwave and millimeter-wave magnetic components are of particular interest for communication and tracking applications where ultra-compact highly integrated millimeter-wave subsystems are needed. Such subsystems include radars, transmitters, receivers, and so on. Other commercial and military applications include magnetic sensors, actuators, transformers, and inductors. Magnetic devices are key components of many microelectronic chips and systems.

The integration of microwave and millimeter-wave magnetic components onto semiconductor chips has been a major bottleneck, and has limited the development of ultra-compact wafer-level high-frequency modules. RF magnetic materials such as hexoferrites (e.g., $BaFe_{12}O_{19}$) typically require high-temperature sintering (e.g., at 900-1000° C.) after film deposition to exhibit high magnetic performance. This is particularly detrimental for integration of magnetic components onto integrated circuit (IC) wafers where process temperatures are generally limited to 300° C. Therefore, it has been challenging to develop deposition technologies for magnetic materials that feature (1) patternability, (2) high magnetic performance, (3) low processing temperature (<250° C.), (4) thickness control (1-10 µm range), and (5) wafer-level deposition and processing.

Liquid-phase epitaxy to form ferrites is limited by low film thickness, maximum wafer size, thermal expansion mismatch, and low magnetic performance. Screen printing is limited by maximum wafer size, thermal expansion mismatch, and high processing temperature. Pulsed laser deposition is limited by low film thickness, maximum wafer size, thermal expansion mismatch, and high processing temperature. Electrophoresis is limited by low film thickness, low magnetic performance, and high voltage requirements. Nanoparticle composites are limited by low film thickness (although stacking could be done), low magnetic performance, and low temperature stability arising from a thin resist layer.

In most work involving nanomagnetic components, nanoparticles are suspended in polymer and the composite is spun onto the chip. However, this creates a low fill factor of magnetic components. Furthermore, the magnetic material resists chemical etching and makes patterning of this material highly problematic. Outside the systems level, different ways of patterning self-assembled nanoparticles have been studied, including a layer-by-layer method of alternating charged polyelectrolytes to build a thick base before assembling nanoparticles of tens of nanometers in thickness.

U.S. Pat. No. 8,475,869 describes a polydimethylsiloxane stamp to pattern dry or semi-dry nanoparticles onto a surface. This technique cannot build up beyond a few monolayers of nanoparticles. U.S. Patent Pub. No. 2009/0098366 describes electrostatically-driven assembly of metal nanoparticles onto substrates. Organically functionalized nanoparticles are employed, and no surface patterning is disclosed. U.S. Patent Pub. No. 2005/0009079 describes build-up of thickness of assembled nanoparticles through a layer-by-layer approach. No patternability is demonstrated. Chao et al., "Millimeter-wave hexagonal nano-ferrite circulator on silicon CMOS substrate," Microwave Symposium (IMS), 2014 IEEE MTT-S International, describe a photoresist/$BaFe_{12}O_{19}$ nanoparticle composite for on-chip circulators. No patternability is demonstrated, and it is well-known that fill factor must remain low (<30%) to retain photodefinable capabilities. Resist/nanoparticle composites are also very sensitive to temperature. Kotov et al., "Layer-by-Layer Self-Assembly of Polyelectrolyte-Semiconductor Nanoparticle Composite Films," J. Phys. Chem. 1995, 99, 13065-13069, describe a layer-by-layer approach to self-assembling semiconductor nanoparticles. The highest estimated thickness achieved was 100 nm. Furthermore, no patternability is demonstrated.

What is desired is a method to densely pack nanoparticles hundreds of nanometers or microns thick, with spatially selective deposition.

SUMMARY OF THE INVENTION

The present invention addresses the aforementioned needs in the art, as will now be summarized and then further described in detail below.

In some variations, the invention provides a method of depositing nanoparticles on a substrate, the method comprising:

(a) providing or preparing a substrate having a positive or negative surface charge;

(b) optionally depositing a polymer on the substrate, wherein the polymer has opposite charge polarity compared to the substrate; and (c) simultaneously depositing first nanoparticles and second nanoparticles onto the substrate, with or without the polymer disposed thereon, wherein the first nanoparticles and the second nanoparticles have opposite charge polarities during the depositing in this step.

In some embodiments, the substrate is prepared to have the positive or negative surface charge by applying, to the substrate, one or more compounds selected from the group consisting of thiols, silanes, alkoxysilanes, and phosphonic acids.

In some embodiments, the substrate contains, on its surface, a functional group selected from the group consisting of amine, imine, ammonium, carboxylate, sulfate, phosphate, and combinations thereof.

When step (b) is performed, the polymer may contain a functional group selected from the group consisting of amine, imine, ammonium, carboxylate, sulfate, phosphate, and combinations thereof. In various embodiments, the polymer is selected from the group consisting of poly (acrylic acid), poly(quarternary ammonium salts), poly(alkyl amines), poly(alkyl carboxylic acids) including copolymers of maleic anhydride or itaconic acid, poly(ethylene imine), poly(propylene imine), poly(vinylimidazoline), poly (trialkylvinyl benzyl ammonium salt), heparin, dextran sulfate, λ-carrageenan, pentosan polysulfate, mannan sulfate, chondroitin sulfate, poly(carboxymethylcellulose), poly(D-lysine), poly(L-lysine), poly(L-glutamic acid), poly(L-aspartic acid), poly(γ-glutamic acid), and combinations thereof.

The first nanoparticles are typically different chemically from the second nanoparticles. In some embodiments, the first nanoparticles and the second nanoparticles have at least one common element.

In certain embodiments, the first nanoparticles, the second nanoparticles, or both of the first and second nanoparticles are magnetic nanoparticles. Magnetic nanoparticles may be selected from the group consisting of $Fe_3O_4$, $BaFe_{12}O_{19}$, $SrFe_{12}O_{19}$, $CoFe_2O_4$, $Mn_xZn_{(1-x)}Fe_2O_4$, $Ni_xZn_{(1-x)}Fe_2O_4$, and combinations thereof (x is from 0 to 1).

The first nanoparticles, the second nanoparticles, or both of the first and second nanoparticles may be suspended in a liquid, which may be aqueous or non-aqueous. The liquid may include, or consist of, water. Optionally, a salt is included in the liquid to screen charges of the first nanoparticles and/or the second nanoparticles.

In some embodiments, a magnetic field is applied during the method of depositing nanoparticles on a substrate. The magnetic field may be created with a permanent magnet or an electromagnet, for example.

The first nanoparticle composition and the second nanoparticle composition may form a layer on the substrate. The layer may have a thickness from about 100 nanometers to about 10 microns, for example.

Other variations of the invention provide a method of depositing a layer of nanoparticles on a substrate, the method comprising:

(a) providing or preparing a substrate having a positive or negative surface charge;

(b) providing or preparing faceted nanoparticles;

(c) preparing a nanoparticle solution containing the nanoparticles, wherein the nanoparticle solution has a solution pH effective to create a plurality of charged, dispersed nanoparticles with the same or opposite charge polarity compared to the substrate; and (d) adjusting surface charge of the charged, dispersed nanoparticles by changing the solution pH to reduce the magnitude of average zeta potential of the charged, dispersed nanoparticles to less than 30 mV, thereby causing aggregation of the charged, dispersed nanoparticles onto a surface of the substrate.

In some embodiments, the substrate is prepared to have the positive or negative surface charge by applying, to the substrate, one or more compounds selected from the group consisting of thiols, alkoxysilanes, and phosphonic acids.

In some embodiments, the substrate contains, on its surface, a functional group selected from the group consisting of amine, imine, ammonium, carboxylate, sulfate, phosphate, and combinations thereof.

In some embodiments, prior to step (d), the dispersed nanoparticles have opposite charge polarity compared to the substrate. In other embodiments, prior to step (d), the charged, dispersed nanoparticles have the same charge polarity as the substrate.

In step (d), the solution pH may be changed to reduce the magnitude of average zeta potential to less than 20 mV, or less than 10 mV.

The method may further include depositing a polymer on the substrate, wherein the polymer has opposite charge polarity compared to the substrate.

The faceted nanoparticles may be hexagonally shaped, in certain embodiments. The faceted nanoparticles are preferably characterized by less than 50% size variation, more preferably less than 25% size variation, and most preferably about 10% or less size variation.

The nanoparticles may include multiple types of nanoparticles having potentially differing chemical composition, physical dimensions and geometries, and charges. In some embodiments, the nanoparticles include first faceted nanoparticles and second faceted nanoparticles having opposite charge polarities.

In certain embodiments, the nanoparticles are magnetic nanoparticles, such as those from the group consisting of $Fe_3O_4$, $BaFe_{12}O_{19}$, $SrFe_{12}O_{19}$, $CoFe_2O_4$, $Mn_xZn_{(1-x)}Fe_2O_4$, $Ni_xZn_{(1-x)}Fe_2O_4$, and combinations thereof (x is from 0 to 1).

A magnetic field may be applied during the method of depositing nanoparticles on a substrate. The magnetic field may be created with a permanent magnet or an electromagnet, for example.

The layer may have a layer thickness from about 1 micron to about 100 microns or more. The layer preferably has a packing density of at least 50 vol %, more preferably at least 90 vol %, in some embodiments.

Other variations provide a structure containing an array of faceted nanoparticles, wherein the array of faceted nanoparticles contains at least one hundred individual faceted nanoparticles that are assembled together with a packing density of at least 90 vol %. In certain embodiments, the faceted nanoparticles are essentially free of organic molecules chemically bonded or physically adsorbed to surfaces of the faceted nanoparticles.

DETAILED DESCRIPTION OF EMBODIMENTS OF THE INVENTION

Figure 1:
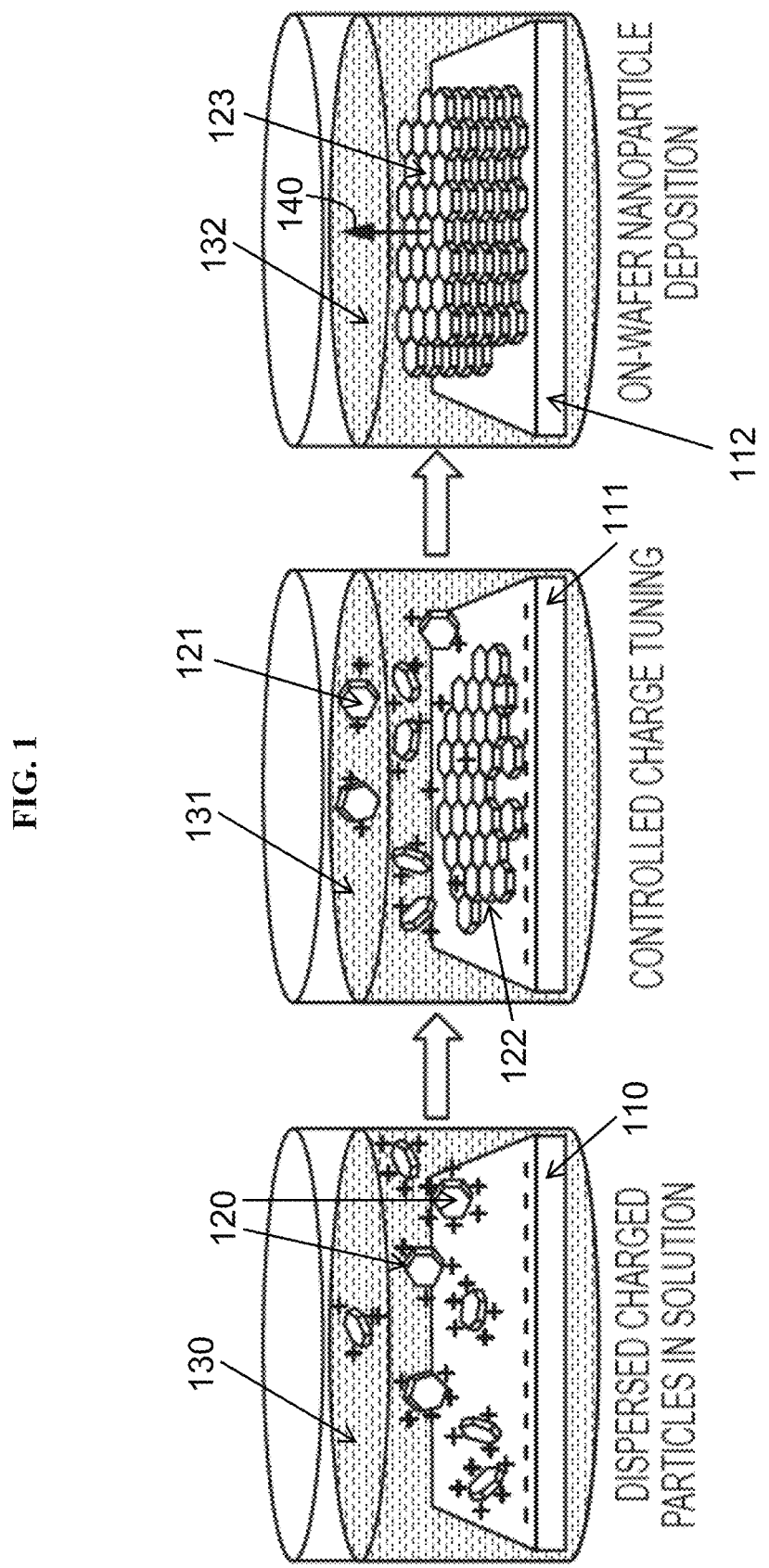
FIG. 1 shows a schematic of an assembly process using hexagonal faceted nanoparticles to assemble one or more layers of nanoparticles, in some embodiments.

The compositions, structures, systems, and methods of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of."

This invention is predicated on the control of electrical surface charge on particles in order to assemble the particles into packed arrays. Some variations provide a method to assemble particles into tightly packed structures or arrays. The method preferably employs spatial and/or temporal control over the zeta potential of the particles to achieve alignment and organization of particles. Generally speaking, methods, devices, and systems of the invention may employ assembly of particles contained, along with a solvent, in bulk solution, preferably with spatial and/or temporal control over the zeta potential of the particles to achieve alignment and organization of particles. In general, fully formed nanoparticles are assembled, instead of combining the synthesis of the nanoparticles themselves (from a solution of precursors) with the assembly process.

The present invention, in some variations, utilizes simultaneous assembly of two (or more) different magnetic nanoparticle materials onto a substrate for integrated radio-frequency (RF) magnetic components (e.g., integrated circuits, microprocessors, inductors, transformers, etc.). The resulting deposited film typically should satisfy two requirements, which are governed by competing physics: (1) spatial selectivity in particle assembly and (2) the ability to build up thickness of the film.

The nanoparticle deposition may be achieved by electrostatically driven assembly of nanoparticles from solution. In this specification, "electrostatic," "electrostatically," and the like includes electromagnetically driven, electrodynamically driven, and electrically driven processes for particle assembly.

Multiple nanoparticle compositions may be co-assembled. In addition, deposition of magnetically susceptible nanoparticles in a magnetic field enables magnetic alignment of the nanoparticles, thus resulting in materials with high magnetic anisotropy—a key feature of high-performance RF magnetic films. Patternability of the deposited film may be achieved by patterning a base layer on the substrate, thereby guiding the deposition of the nanoparticles. Thickness may be built-up by fine-tuning the attracting and competing electrostatic forces in solution by pH modulations, and/or by an external magnetic field. The deposition technique described herein enables high film density.

In contrast to the prior art, the methods described in this specification can result in densely packed nanoparticles hundreds of nanometers thick. The deposition can be spatially selected by patterning an underlying substrate or polymer layer with standard lithography practices before nanoparticle deposition. In some embodiments, the method includes characterization of the nanoparticle surface, with measurement of zeta potential, and tuning the pH of the solution. The disclosed methods are capable of forming, directly from solution, an intermixed structure containing two different, oppositely charged nanoparticles without alternating layers of nanoparticles or of nanoparticle and polymer.

The ability to introduce controlled, spatially selected patterns enables wider functionality of assemblies than (i) homogenous assemblies of one type of particle or (ii) core-shell arrangements of assemblies. Controlled complexity, for instance, enables ring resonators and split-ring resonators, which are building blocks of electromagnetic (including optical) metamaterials.

An "array" or equivalently "assembly" or "packed layer" as intended herein, means a plurality of nanoparticles that are packed together and touching or near touching. In the array, the center-to-center distance between nanoparticles is preferably less than the width of two nanoparticles. More preferably, the center-to-center distance between nanoparticles is less than the width of 1.5 nanoparticles.

In some variations, the invention provides a method of depositing nanoparticles on a substrate, the method comprising:

(a) providing or preparing a substrate having a positive or negative surface charge;

(b) optionally depositing a polymer on the substrate, wherein the polymer has opposite charge polarity compared to the substrate; and (c) simultaneously depositing first nanoparticles and second nanoparticles onto the substrate, with or without the polymer disposed thereon, wherein the first nanoparticles and the second nanoparticles have opposite charge polarities during the depositing in this step.

A substrate may be a substantially flat surface containing a metal, a semiconductor, an insulator, or a combination thereof. Examples include glass slides, silicon wafers, fused silica wafers, and gold-coated silicon wafers.

In some embodiments, the substrate is prepared to have positive or negative surface charge by applying, to the substrate, one or more compounds selected from the group consisting of thiols, silanes, alkoxysilanes, and phosphonic acids. In some embodiments, surface groups, such as quaternary ammoniums that are permanently charged, may be attached using surface modification chemistries such as silanization. In certain embodiments, the substrate is naturally charged. For example, $SiO_2$ can be naturally negatively charged. Silica and silicate glass surfaces immersed in water are known to acquire a negative surface charge density, primarily through the dissociation of terminal silanol groups.

Nanoparticles have at least one size dimension that is less than 10 microns, and preferably less than 1 micron, such as about 900, 800, 700, 600, 500, 400, 300, 200, 100, 50, 25, 10, 5, 2, or 1 nanometers. Nanoparticles may have a wide variety of shapes, such as spherical, elliptical, rod-shaped, plate-like, hexagonal, and others. The principles of the invention may also be applied to particles larger than 10 microns. In some embodiments, the ratio between the shortest and longest dimension of the nanoparticle is from about 1:1 to about 1:5.

The nanoparticles may be symmetric or asymmetric. If the nanoparticles are asymmetric, the long axes of individual nanoparticles may be aligned in the same direction with respect to one another. "Aligned" in this sense means that the long axis of the nanoparticles has a full width at half maximum angular distribution with respect to the array alignment direction of at most about ±20°, more preferably at most about ±10°, and most preferably at most about ±5°.

The nanoparticles may be anisotropic. As meant herein, "anisotropic" nanoparticles have at least one chemical or physical property that is directionally dependent. When measured along different axes, an anisotropic nanoparticle will have some variation in a measurable property. The property may be physical (e.g., geometrical) or chemical in nature, or both. The property that varies along multiple axes may simply be the presence of mass; for example, a perfect sphere would be geometrically isotropic while a cylinder is geometrically anisotropic. A chemically anisotropic nanoparticle may vary in composition from the surface to the bulk phase, such as via a chemically modified surface or a coating deposited on the nanoparticle surface. The amount of variation of a chemical or physical property may be 5%, 10%, 20%, 30%, 40%, 50%, 75%, 100% or more. Nanoparticles may be magnetic from shape anisotropy, in some embodiments.

Surface charges on microparticles and nanoparticles may be altered in many ways. In some embodiments, surface groups with variable charges, such as amines or carboxylic acids, may be attached using silanization. Then the pH of the solution may be altered to change the charge on the functional group by setting the pH above or below the pKa of the functional group. pKa is the negative base-10 logarithm of the acid dissociation constant (Ka) of an acid. For example, the pKa of many carboxylic acids is about pH 4-5. If the pH is less than 4, then there is no charge on the carboxylic acid. If the pH is greater than 5, then the carboxylic acid is deprotonated and the carboxylic group has a negative charge.

If the nanoparticles have an oxide shell or are oxides, then the surface charge may be adjusted with pH. All oxides have an isoelectric point, expressed in pH, at which point the surface is neutral. If the solution pH is less than the isoelectric point, then the surface is positively charged. If the solution pH is greater than the isoelectric point, then the surface is negatively charged.

In some embodiments, the substrate contains, on its surface, a functional group selected from the group consisting of amine, imine, ammonium, carboxylate, sulfate, phosphate, and combinations thereof.

Polymers are organic materials with repeating molecular units. Polymers can be made to carry electrostatic charges by functionalization. When step (b) is performed, the polymer may contain a functional group selected from the group consisting of amine, imine, ammonium, carboxylate, sulfate, phosphate, and combinations thereof. In various embodiments, the polymer is selected from the group consisting of poly(acrylic acid), poly(quarternary ammonium salts), poly (alkyl amines), poly(alkyl carboxylic acids) including copolymers of maleic anhydride or itaconic acid, poly(ethylene imine), poly(propylene imine), poly(vinylimidazoline), poly (trialkylvinyl benzyl ammonium salt), heparin, dextran sulfate, λ-carrageenan, pentosan polysulfate, mannan sulfate, chondroitin sulfate, poly(carboxymethylcellulose), poly(D-lysine), poly(L-lysine), poly(L-glutamic acid), poly(L-aspartic acid), poly(γ-glutamic acid), and combinations thereof.

The first nanoparticles are typically different chemically from the second nanoparticles. That is, the elemental composition of the first nanoparticles is typically different from the second nanoparticles. In some embodiments, the first nanoparticles and the second nanoparticles have at least one common element (e.g., iron), at least two common elements (e.g. iron and oxygen), or all elements in common. It is possible for the first and second nanoparticles to have the same elemental composition but still not be identical, due to differences in physical properties (e.g., particle size, density, or crystallinity), electromagnetic properties (e.g., charge state or magnetization), or thermodynamic properties (e.g., multiple solid phases).

Magnetic nanoparticles are employed, in some embodiments. In certain embodiments, the first nanoparticles, the second nanoparticles, or both of the first and second nanoparticles are magnetic nanoparticles. Magnetic nanoparticles may be selected from the group consisting of $Fe_3O_4$, $BaFe_{12}O_{19}$, $SrFe_{12}O_{19}$, $CoFe_2O_4$, $Mn_xZn_{(1-x)}Fe_2O_4$, $Ni_xZn_{(1-x)}Fe_2O_4$, and combinations thereof (x is from 0 to 1, such as about 0, 0.1, 0.2, 0.3, 0.4, 0.5, 0.6, 0.7, 0.8. 0.9, or 1.0).

The nanoparticles may comprise a fluoride, an oxide, a sulfide, or a combination thereof. The nanoparticles have an average isoelectric point that may be measured using a zeta potential measurement. The isoelectric point is the pH where the zeta potential is 0. Note that "oxides" also includes hydroxides and oxyhydroxides.

In some embodiments, the nanoparticle contains a core of a metal and a shell that is or includes an oxide, fluoride, sulfide, or combination thereof. In these or other embodiments, the nanoparticle contains a core of metal and a shell that is or includes an oxide, fluoride, sulfide, or combination thereof. In these or other embodiments, the nanoparticle contains a core of a ceramic (or ceramic with metal) and a shell that is or includes an oxide, fluoride, sulfide, or combination thereof.

The oxide, fluoride, or sulfide may be metal oxides, metal fluorides, metal sulfides, or another material (e.g., polymer or ceramic) in oxide, fluoride, or sulfide form. The oxide, fluoride, or sulfide may be present as carbon-free O-containing groups, carbon-free F-containing groups, or carbon-free S-containing groups, respectively, chemically bonded to the nanoparticle core.

In some embodiments (such as fluoride-based nanoparticles), the nanoparticles may have inorganic ligands (e.g., tetrafluoroborate, $BF_4^-$ ligands or SCN-thiocyanide) or other organic-free, positively or negatively charged ligands or hydrophilic ligands on the surface to help keep them dispersed in solution. When present, the ligands may be loosely bound such that a zeta potential response with pH is observed.

The first nanoparticles, the second nanoparticles, or both of the first and second nanoparticles may be dissolved or suspended in a liquid, which may be aqueous or non-aqueous. The liquid may function as a solvent for the first nanoparticles and/or the second nanoparticles, or the liquid may serve as a carrier for suspending (but not dissolving) the first nanoparticles and/or the second nanoparticles. The liquid may include, or consist essentially of, water. Other liquids may include dimethyl formamide, dimethylsulfoxide, isopropanol or another alcohol, acetone, tetrahydrofuran, or mixtures of these solvents. Optionally, a salt is included in the liquid to screen charges of the first nanoparticles and/or the second nanoparticles. Brownian motion, sonication, gas sparging, and/or bulk mixing (e.g., agitation or vessel rotation) may be used to keep the nanoparticles suspended in the liquid. In some embodiments, a seed of assembled nanoparticles may be added to a dispersed solution of the same nanoparticles.

"Charge polarity" means positive charge or negative charge, regardless of the magnitude of the charge. For example, positive charge polarity includes +1, +2, etc. while negative charge polarity includes −0.5, −2, etc. In the accompanying drawings, unit charges are implied (+ or −) but it should be understood that the actual charge magnitudes may differ from ±1. Actual charges present on the nanoparticle surface may be partial charges that are only slightly non-neutral (e.g. average charge of greater than +0.1 or less than −0.1).

In some embodiments, the first nanoparticles and second nanoparticles have the same charge polarity prior to step (c). A change in solution properties (e.g., pH) affecting one or both of the first and second nanoparticles is then made, so that they have opposite charge polarities.

In some embodiments, a magnetic field is applied during the method of depositing nanoparticles on a substrate. The magnetic field may be created with a permanent magnet or an electromagnet, for example. In these embodiments, the magnetic field is preferably applied perpendicular to the substrate. This is the preferred magnetic direction to generate a square magnetic hysteresis curve for a circulator. In other embodiments, the magnetic field is applied parallel to the substrate, or at an angle to the substrate.

The first nanoparticle composition and the second nanoparticle composition may form a layer on the substrate. The layer may have a thickness from about 100 nanometers to about 10 microns, such as about 0.2, 0.5, 1, 2, 5, or 10 microns, for example. The layer thickness may be uniform or non-uniform.

The layer of nanoparticles preferably has a packing density of at least 50 vol %. In various embodiments employing first and second nanoparticles that are simultaneously deposited, the layer of nanoparticles has a packing density of about 50, 55, 60, 65, 70, 75, 80 vol % or higher. The "layer packing density" is the percentage of the theoretical maximum volumetric density, equal to 100 vol % minus the void (volume) density. Tighter packing (higher packing density) means fewer voids or lower total void volume, and conversely, lower-density packing means a greater number of voids or higher total void volume (open space). The void volume may be calculated as the open volume per total volume, expressed as a percentage. In certain embodiments, the packing density approaches, or is about, 100 vol % of the theoretical packing density associated with the shape(s) of particles present. In certain embodiments, the layer of nanoparticles approaches, or is about, 0 vol % void volume.

Figure 2:
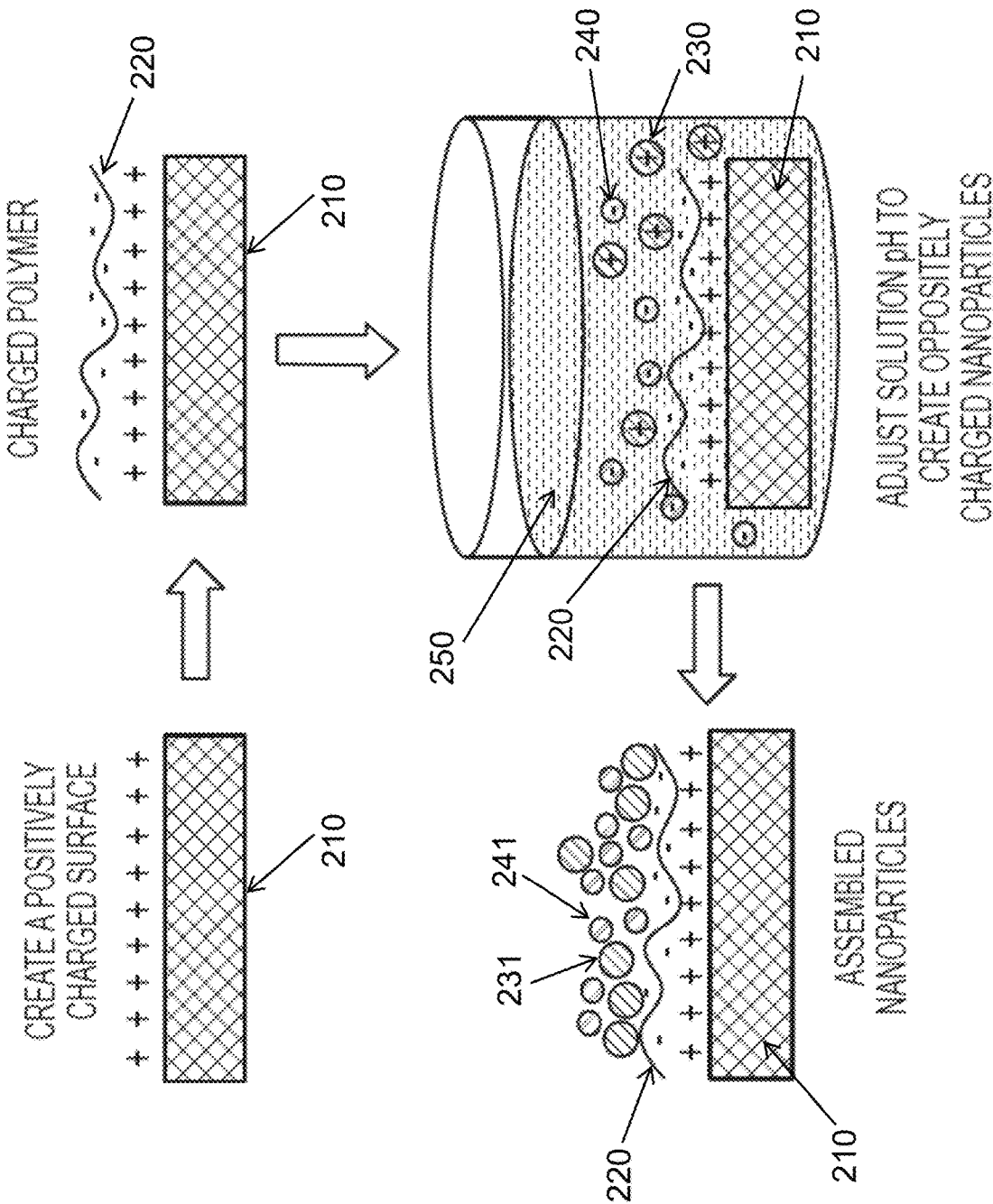
FIG. 2 shows a schematic of an assembly process to fabricate a layer of two types of nanoparticles on a substrate, in some embodiments.

An approach of assembling a layer of nanoparticles on a substrate is shown schematically in FIG. 2. This embodiment is a co-assembly method in which two types of nanoparticles are deposited onto a substrate, optionally with a charged polymer binder, in some embodiments. This method enables very high film density.

First, a cleaned substrate 210 is chemically treated such that the surface is positively charged (in this illustration). A surface charge may be imparted by reacting the surface such as glass with an organic compound such as a trimethoxysilane with a quaternary amine end. Optionally, the positively charged substrate 210 is subsequently bound to a negatively charged polymer 220. A polymer 220 may provide a more-uniform surface charge on the substrate, in some embodiments.

The (optionally polymer-coated) substrate 210 is submerged into a solution 250 of at least one type of nanoparticles 230, preferably two types of nanoparticles 230 and 240. When a polymer 220 is present as shown in FIG. 2, and there is only one type of nanoparticle 230, the pH of the nanoparticle suspension is adjusted such that the polymer 220 on the surface of the substrate remains negatively charged, while the nanoparticles 230 are positively charged. When a polymer 220 is present and there are two types of nanoparticles (first and second nanoparticles, 230 and 240), as shown in FIG. 2, the pH of the nanoparticle solution or suspension 250 is adjusted such that the polymer 220 on the surface of the substrate remains negatively charged, while the first and second nanoparticles 230 and 240 are oppositely charged with respect to each other.

When a polymer 220 is not present on the substrate, and there is only one type of nanoparticle 230, the pH of the nanoparticle suspension (solution) is adjusted such that the substrate 210 remains positively charged, while the nanoparticles 230 are negatively charged. When a polymer 220 is not present and there are two types of nanoparticles (first and second nanoparticles, 230 and 240), the pH of the nanoparticle solution or suspension 250 is adjusted such that the substrate 210 remains positively charged, while the first and second nanoparticles 230 and 240 are oppositely charged with respect to each other. Nanoparticles assemble onto the substrate 210 (or onto the polymer 220 which is disposed on the substrate 210) as nanoparticles 231 and (optional) 241.

Note that in FIG. 2, the substrate 210 carries a positive surface charge. The substrate 210 may alternatively carry a negative charge; all other charge polarities are then reversed as well. Also it is noted that when two types of nanoparticles 230 and 240 are present, initially they may have the same charge polarity (i.e., positive or negative) or even the same actual charge (e.g., +1, −2, etc.). Prior to and/or during the step of depositing, a pH change causes the first nanoparticles 230 and second nanoparticles 240 to have opposite charge polarities. A pH change may be caused by addition or acid or base, for example.

In some embodiments, it is beneficial to include a salt in the solution. Exemplary salts include, but are not limited to, sodium chloride, calcium carbonate, sodium bisulfate, and iron acetate. Preferably, the salt is selected such that its cations or anions are not common with the nanoparticle composition. The salt concentration in solution may vary, such as from about 0.01 mol/liter to about 1 mol/liter, e.g. about 0.02, 0.05, 0.1, 0.2, 0.3, 0.4, or 0.5 mol/liter of salt in the solution.

A salt helps screen charges and reduces repulsion between nanoparticles that carry the same charge polarity. Screening charges in this way allows for higher binding density on the substrate, since nanoparticles can be closer together during deposition. The density and thickness of the nanoparticles bound onto the substrate typically depends on both the pH and salt concentration during the nanoparticle assembly. The nanoparticles need to be charged enough to be electrostatically bound to the substrate, but if the charge density is too high, inter-particle repulsion will reduce the desired aggregation of nanoparticles at the substrate surface. There are competing effects. A small concentration of salt in the solution helps screen some of the charges around the nanoparticles to create higher density coverage.

The method preferably includes a careful characterization of the nanoparticle surface charges at various pH values. One technique to estimate the surface charge in solution is by measuring the zeta potential of the nanoparticle. As is well-known, zeta potential may be determined in a dynamic light scattering set-up with an applied electric field. This measurement can determine the "isoelectric point" of a nanoparticle, defined as the pH at which the nanoparticle carries no net electrical charge.

Nanoparticles may be dispersed (i.e., dissolved and/or suspended as a colloid) in solution by first adjusting the solution pH to increase the zeta potential above +20 mV or below −20 mV. In this disclosure, the notation "±20 mV" (for example) in reference to zeta potential means that the zeta potential is 20 mV in magnitude (absolute value) and may be either 20 mV or −20 mV; this does not refer to a range of values between −20 mV to 20 mV. Note that there is not necessarily an initial adjustment of pH for dispersion of the nanoparticles in solution, if the starting nanoparticles are sufficiently charged (i.e. sufficiently different from their isoelectric points).

The pH of the solution is then titrated towards the isoelectric point of the nanoparticles. When two types of nanoparticles are present, the pH may be titrated toward one of the nanoparticle's isoelectric point. Alternatively, or additionally, the pH may be titrated past one of the nanoparticle's isoelectric point but not past the other nanoparticle's isoelectric point, so that one nanoparticle switches charge polarity while the other nanoparticle remains with its initial charge polarity. In certain embodiments, the pH is first titrated to a first nanoparticle's isoelectric point and then titrated toward a second nanoparticle's isoelectric point. The specific titration protocol will depend on the starting charge states of the nanoparticles. A buffer may optionally be used to slow down the rate of pH change near the isoelectric point or at other points during the titration.

The pH titration is preferably uniformly (in space) within the solution to induce assembly of the nanoparticles. The pH titration may be accomplished with an acid or a base. In some embodiments, pH is adjusted with a triggerable pH-control substance, such as a thermal acid/base generator or a photoacid/base generator, by heating the solution and/or exposing it to light at one or more effective wavelengths, in a controlled manner. Triggerable pH-control substances can enable more-uniform pH titration, which may assist in creating tightly packed arrays of nanoparticles. Also, the use of a triggerable pH-control substance allows the rate of change of pH to be controlled, by controlling the heat (or cooling) input or the amount of UV light input.

The pH of the solution, and thus the zeta potential of the particles being assembled, may be controlled temporally, spatially, or both temporally and spatially. In some embodiments employing temporal pH control, pH and zeta potential change more slowly as the isoelectric point is approached. The decrease could be gradual and continuous, or could be periodic step decreases, for example. In some embodiments, the pH of the solution is varied in both time and in space to optimize the packing, such as to increase the size and/or alignment of the arrays. The pH of the solution, and thus the zeta potential of the particles being assembled, may be oscillated in time to refine the packing, such as to increase the size and/or alignment of the arrays. For example, pH oscillation may be triggered by placing both a photoacid and a photobase in the solution, wherein the photoacid and photobase are susceptible to two different wavelengths, and then alternately exposing the solution to the two wavelengths.

The average zeta potential, prior to triggering the pH-control substance, is preferably at least ±30 mV (i.e., +30 mV or more, or alternatively, −30 mV or less) and its magnitude is reduced in the deposition method. That is, the zeta potential can start high (positive) and be reduced to a lower value, closer to zero. Or, the zeta potential can start highly negative and be increased to a lower magnitude (less negative), closer to zero. Thus for example when the average zeta potential is reduced from ±30 mV to ±10 mV, this ± notation means that either the average zeta potential is reduced from +30 mV to +10 mV, or increased mathematically (but reduced in magnitude) from −30 mV to −10 mV. In some embodiments, the average zeta potential is reduced to ±10 mV, ±5 mV, ±2 mV, ±1 mV, or less, at the titrated pH compared to the starting pH.

In some embodiments of the invention, the average zeta potential of the nanoparticles in the liquid solution changes at a rate from about ±1 mV/hr to about ±50 mV/hr, i.e. a magnitude (absolute value) from about 1 mV/hr to about 50 mV/hr. In certain embodiments, the average zeta potential changes at a rate from about ±5 mV/hr to about ±30 mV/hr, i.e. a magnitude from about 5 mV/hr to about 30 mV/hr. The values may be positive or negative since the zeta potential may start negative or positive, and approach zero. In particular, when the average zeta potential is decreasing from a positive number toward zero (e.g. from 10 mV to 1 mV), the rate of change will be negative. When the average zeta potential is increasing from a negative number toward zero (e.g. from ~10 mV to −1 mV), the rate of change will be positive.

In some embodiments, the nanoparticles are characterized by an average surface-charge density. The average surface-charge density is lower at the titrated pH compared to the starting pH, thereby causing the nanoparticles to assemble. The average surface-charge density (at the titrated pH) may be, for example, from about 0 to about 0.05, 0.1, 0.15, 0.2, or 0.25 number of charges per $nm^2$ of surface.

In these methods of assembling nanoparticles, reaction devices may be employed as described in copending U.S. patent application Ser. No. 15/241,661, filed Aug. 19, 2016, which is hereby incorporated by reference herein.

The assembly of the nanoparticles, in various embodiments, is characterize by an assembly rate (particles assembled per second) of about $10^6$, $10^7$, $10^8$, $10^9$, $10^{10}$, $10^{11}$, $10^{12}$ or more.

The assembled nanoparticles are then separated from the solution. This separation may be done with centrifugation, filtration, evaporation of the solution, etc. The array of assembled nanoparticles is optionally dried to remove any residual solution. The array may then be utilized as a nanoparticle-containing object.

In some embodiments, very dense (up to 100% dense) assembled nanoparticle films may be assembled, if faceted nanoparticle shapes such as hexagonal prisms are employed. A "faceted nanoparticle" means a nanoparticle that possesses at least two faces, i.e. outward-facing sides defined by edges and vertices. A sphere or ellipsoid contain one face and therefore are not faceted. The number of faces may vary, such as 2 (long, flat plate), 3 (triangular prism), 4 (cubes or rectangular prisms), or more complex polyhedron shapes.

The faceted nanoparticles may be hexagonally shaped, in certain embodiments. "Hexagonally shaped" means that the nanoparticles are in the shape of hexagonal prisms, characterized by a polyhedron with hexagonal base and 8 faces, 18 edges, and 12 vertices. In various embodiments, at least 50%, 60%, 70%, 80%, 90%, 95%, or 99% of the nanoparticles are hexagonally shaped. Other nanoparticles may or may not be faceted.

The faceted nanoparticles preferably have a size dispersity index close to 1.0. The "size dispersity index" for a plurality of nanoparticles is defined as the ratio of the variance in nanoparticle sizes to the mean in nanoparticle sizes. The size dispersity index is a measure of the heterogeneity of sizes of particles in a mixture. A size dispersity index of exactly 1.0 means the nanoparticles are uniform or monodisperse (all equal sizes). A size dispersity index of greater than 1.0 means the nanoparticles are non-uniform or polydisperse. The size dispersity index cannot be less than 1. The nanoparticles may be said to have x % size variation which equates to a size dispersity index of 1+x/100. As an example, 25% size variation of nanoparticles is the same as a size dispersity index of 1.25.

Monodisperse nanoparticles packed in an ordered morphology can achieve the high densities that result in state-of-art magnetic properties. By contrast, randomly packed spheres, resulting from non-uniform sizes in the feedstock material or from uncontrolled agglomeration, typically result in about 50-60 vol % density. Assembly techniques such as layer-by-layer or nanoparticle deposition in a polymer binder (e.g., photoresist) result in random packing. Ordered spheres improve packing fractions up to 74 vol % density for uniform spheres, and up to 86 vol % for bimodal spheres. Hexagonal plates or prisms allow packing densities of 90 vol % or more, and theoretically 100 vol % in the absence of defects, impurities, and so forth.

Therefore, assembly of monodisperse and faceted nanoparticles enables very high film density. FIG. 1 shows a schematic of an assembly process using hexagonal faceted nanoparticles, without polymeric binder, to assemble one or more layers of nanoparticles. First, charged nanoparticles 120 are dispersed in solution 130 above an oppositely charged substrate 110. In FIG. 1, the substrate 110 carries a negative surface charge while the nanoparticles 130 have a positive charge. The charge polarities can be reversed.

Optionally, the nanoparticles may start in solution as uncharged particles, or as particles that have the same charge polarity as the substrate (whether negative or positive). In that case, the solution pH may then be adjusted to create a plurality of charged, dispersed nanoparticles.

In the second step depicted in FIG. 1, the surface charge of the dispersed nanoparticles 121 is adjusted by changing the pH of solution 131 to reduce the magnitude of average zeta potential of the charged, dispersed nanoparticles 121 closer to 0 mV, such as down to an average zeta potential magnitude less than 30 mV, less than 20 mV, or less than 10 mV, thereby causing aggregation of the nanoparticles 122 onto the substrate (wafer) 111 surface.

FIG. 1 depicts five layers of nanoparticles 123, without implying a limitation. The arrow 140 above the nanoparticle layers 123 illustrates the magnetic easy axis, which is an energetically favorable direction of spontaneous magnetization, in some embodiments employing magnetic nanoparticles.

Some variations of the invention provide a method of depositing a layer of nanoparticles on a substrate, the method comprising:

(a) providing or preparing a substrate having a positive or negative surface charge;

(b) providing or preparing faceted nanoparticles;

(c) preparing a nanoparticle solution containing the nanoparticles, wherein the nanoparticle solution has a solution pH effective to create a plurality of charged, dispersed nanoparticles with the same or opposite charge polarity compared to the substrate;

(d) adjusting surface charge of the charged, dispersed nanoparticles by changing the solution pH to reduce the magnitude of average zeta potential of the charged, dispersed nanoparticles to less than 30 mV, thereby causing aggregation of the charged, dispersed nanoparticles onto a surface of the substrate.

In some embodiments, the substrate is prepared to have the positive or negative surface charge by applying, to the substrate, one or more compounds selected from the group consisting of thiols, alkoxysilanes, and phosphonic acids.

In some embodiments, the substrate contains, on its surface, a functional group selected from the group consisting of amine, imine, ammonium, carboxylate, sulfate, phosphate, and combinations thereof.

In some embodiments, prior to step (d), the dispersed nanoparticles have opposite charge polarity compared to the substrate. In other embodiments, prior to step (d), the charged, dispersed nanoparticles have the same charge polarity as the substrate.

In step (d), the solution pH may be changed to reduce the magnitude of average zeta potential to about, or less than about, 25, 20, 15, 10, 9, 8, 7, 6, 5, 4, 3, 2, or 1 mV. Note (as discussed elsewhere) that these are magnitudes, i.e. absolute values of zeta potential itself which can be positive or negative.

The method of these variations may further include depositing a polymer on the substrate, wherein the polymer has opposite charge polarity compared to the substrate. A polymer may provide for more uniform charge distribution on the substrate.

The faceted nanoparticles are preferably characterized by less than 50% size (particle volume) variation, more preferably less than 25% size variation, and most preferably about 10% or less size variation.

The nanoparticles may include multiple types of nanoparticles having potentially differing chemical composition, physical dimensions and geometries, and charges. In some embodiments, the nanoparticles include first faceted nanoparticles and second faceted nanoparticles having opposite charge polarities.

In certain embodiments, the nanoparticles are magnetic nanoparticles, such as those from the group consisting of $Fe_3O_4$, $BaFe_{12}O_{19}$, $SrFe_{12}O_{19}$, $CoFe_2O_4$, $Mn_xZn_{(1-x)}Fe_2O_4$, $Ni_xZn_{(1-x)}Fe_2O_4$, and combinations thereof (x is from 0 to 1).

A magnetic field may be applied during the method of depositing nanoparticles on a substrate. The magnetic field may be created with a permanent magnet or an electromagnet, for example.

In some embodiments, a magnetic field is applied during the method of depositing nanoparticles on a substrate. The magnetic field may be created with a permanent magnet or an electromagnet, for example. In these embodiments, the magnetic field is preferably applied perpendicular to the substrate. This is the preferred magnetic direction to generate a square magnetic hysteresis curve for a circulator. In other embodiments, the magnetic field is applied parallel to the substrate, or at an angle to the substrate.

The layer of nanoparticles may have a layer thickness from about 1 micron to about 100 microns or more, such as a layer thickness of about, or at least about, 5, 10, 20, 30, 40, 50, 75, or 100 microns. The layer thickness may be uniform or non-uniform.

The layer of nanoparticles preferably has a packing density of at least 50 vol %, more preferably at least 90 vol %, in some embodiments. In various embodiments, the layer of nanoparticles has a packing density of about 50, 55, 60, 65, 70, 75, 80, 85, 90, 95, 99, or 100 vol %.

Other variations provide a structure containing an array of faceted nanoparticles, wherein the array of faceted nanoparticles contains at least one hundred individual faceted nanoparticles that are assembled together with a packing density of at least 90 vol %. In certain embodiments, the faceted nanoparticles are essentially free of organic molecules chemically bonded or physically adsorbed to surfaces of the faceted nanoparticles. The faceted nanoparticles may be magnetic nanoparticles.

In some embodiments, the array of faceted nanoparticles includes or is derived from at least 10, 50, 100, 200, 300, 400, or 500 individual particles, and the array of faceted nanoparticles is characterized by a packing density of at least 50%, 60%, 70%, 80%, or 90% on a volume basis.

Some variations of the invention provide electrostatically assisted assembly of multiple layers of nanoparticles onto a pre-determined pattern.

Figure 3:
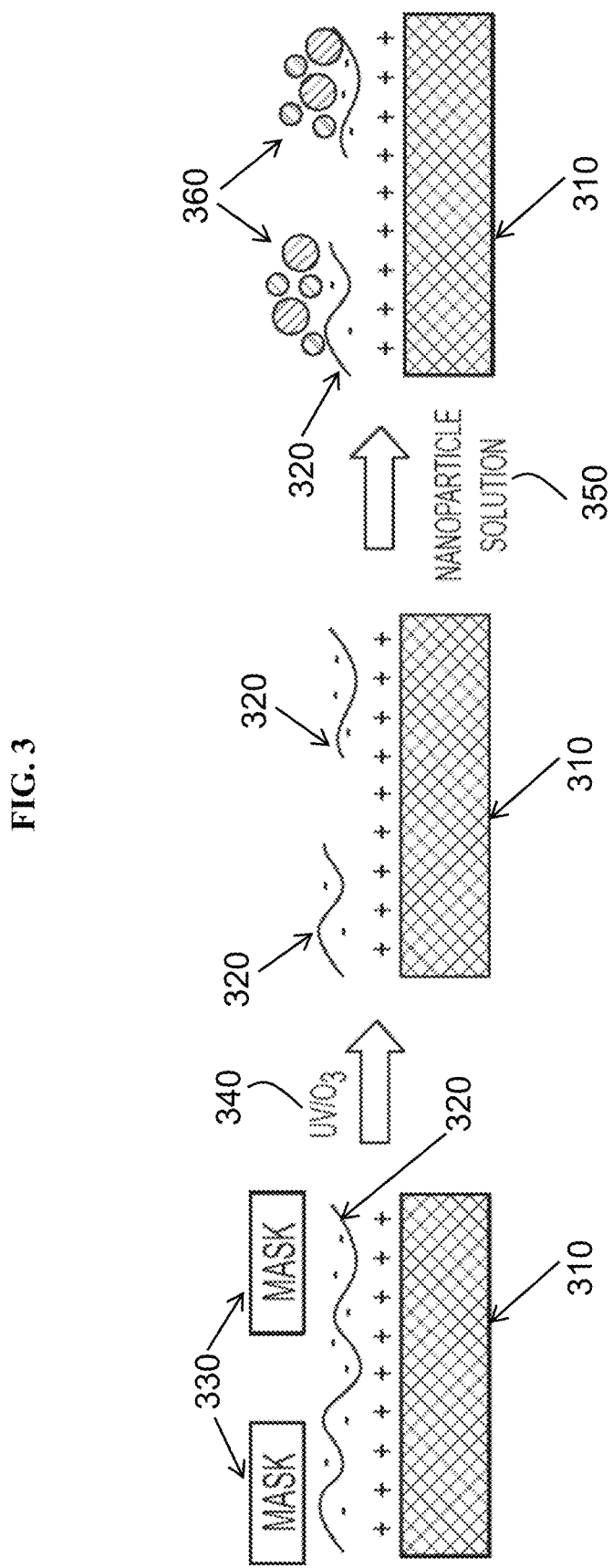
FIG. 3 shows a schematic of a process for patterning the assembly of nanoparticles, in some embodiments.

Due to the electrostatically driven binding of the nanoparticles and the polymer (when present), magnetic materials may be selectively patterned. An example of patterning the assembly of nanoparticles is shown schematically in FIG. 3. A shadow mask 330 (fabricated using conventional dry etching techniques) may be placed over a substrate 310, coated with polymer 320. The substrate 310 with shadow mask 330 may then be exposed to UV and ozone 340, for example, to remove the polymer 320 region that is not masked. The substrate 310 may then be dipped into a solution 350 containing nanoparticles, for deposition into a patterned nanoparticle layer 360 according to methods disclosed previously herein.

Some embodiments provide a magnetic nanocomposite that includes a magnetic material with a high energy product made from tightly packed metal nanoparticles. In some embodiments, the nanoparticles disclosed herein do not contain expensive rare-earth elements (such as neodymium or dysprosium) or precious metals (such as platinum).

Magnetic nanocomposites can provide the performance of higher-cost, rare earth element-based magnets at lower cost and mass by structuring low-cost metals instead of using rare earths, which can have significant cost and supply fluctuations. Magnetic nanocomposites can also provide equal or better performance compared to existing nanoparticle-based magnets at lower mass.

In some embodiments utilizing magnetic nanoparticles, logic devices are first built onto a wafer (substrate). Metallic traces are deposited to carry signals in a circulator on the substrate. The location and attachment of a magnetic core (e.g., magnetic donut) are designated lithographically. Nanoparticles are then deposited on the magnetic core area, defined lithographically. A lift-off process may be employed to remove nanoparticles deposited in unwanted places. A polymer or other layer is optionally added to immobilize the nanoparticles.

Advantages that arise from various embodiments include (1) wafer-level processing, (2) low-temperature deposition, (3) patternability, (4) thickness control in the 0.01-100 μm range, and/or (5) high layer (film) density. These features provide high magnetic performance under appropriate selection of magnetic nanoparticles.

For certain magnetic materials such as hexagonal ferrite nanoparticles with c-axes out of the basal plane, high packing alignment enables a squareness ratio $M_r/M_s$ up to 1, compared to $M_r/M_s=0.5$ for random alignment ($M_r$=magnetic remanence and $M_s$=saturation magnetization). Some preferred embodiments of the invention provide a magnetic material characterized by a saturation magnetization $M_s$ greater than about 0.25 kG, anisotropy $H_a$ greater than about 10 kOe, loss tangent less than about 0.005, and thickness of at least 50 microns.

EXAMPLES

Example 1: Characterization of Magnetic Nanoparticles

Characterization of magnetic nanoparticle surface charges is important to achieving dense assembly of particles out of solution. The surface charge of a colloidal suspension of $BaFe_{12}O_{19}$ and $SrFe_{12}O_{19}$ are measured in an electrophoretic light scattering system. The nanoparticles (<100 nm in diameter) are suspended in water and titrated to various pH values with hydrochloric acid (HCl). At each pH, the zeta potential is measured.

Figure 4:
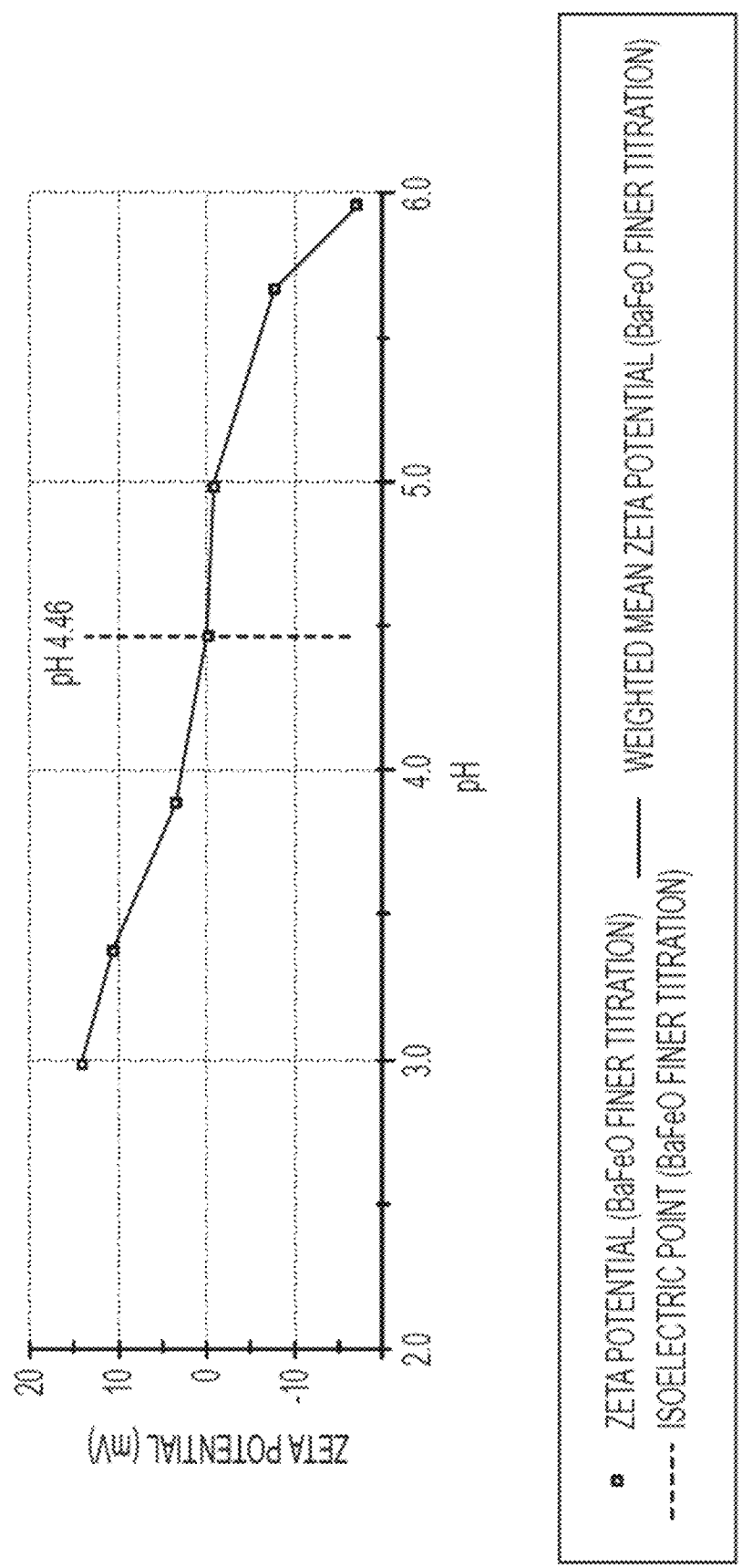
FIG. 4 shows the zeta potential at different pH values for aqueous suspensions of $BaFe_{12}O_{19}$, in Example 1.
Figure 5:
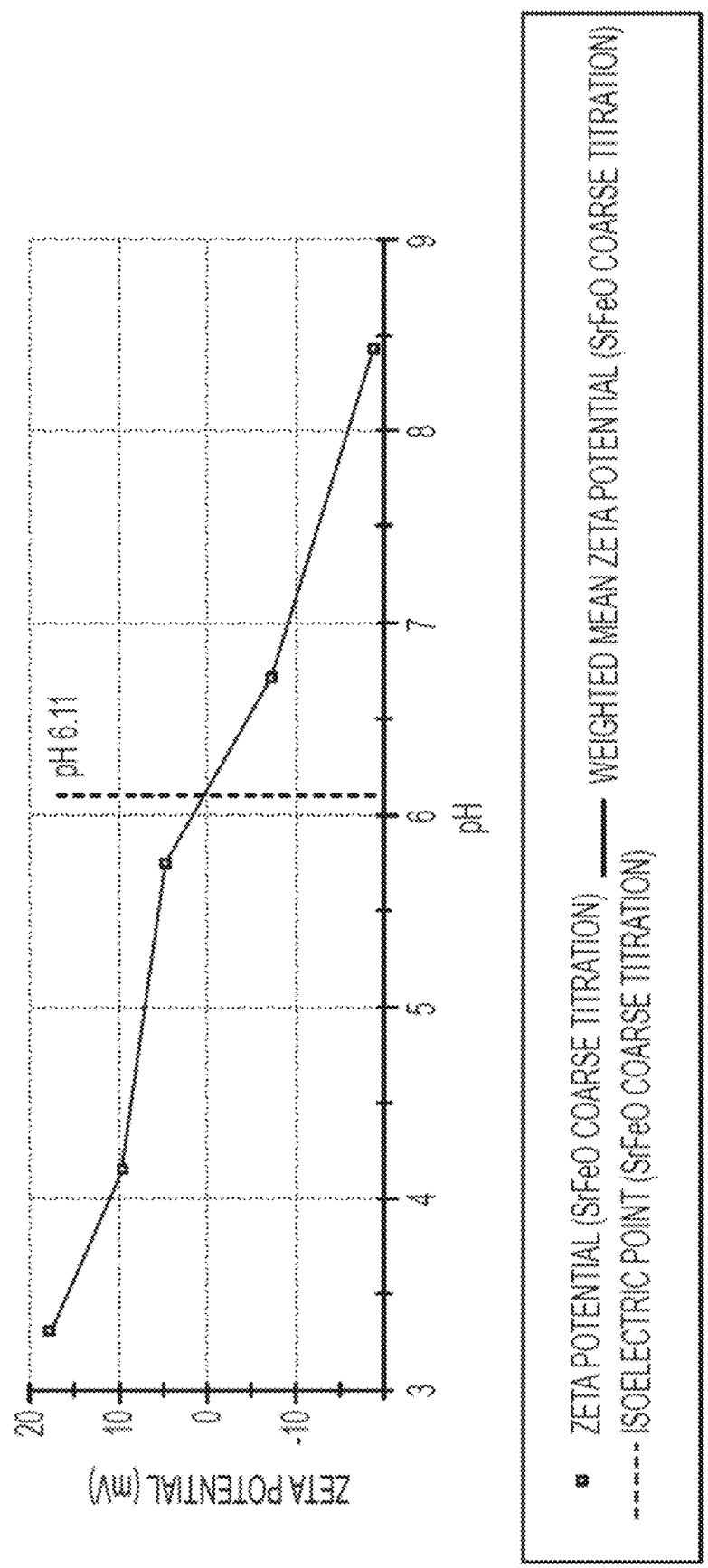
FIG. 5 shows the zeta potential at different pH values for aqueous suspensions of $SrFe_{12}O_{19}$, in Example 1.

FIG. 4 shows the zeta potential at different pH values for aqueous suspensions of $BaFe_{12}O_{19}$. FIG. 5 shows the zeta potential at different pH values for aqueous suspensions of $SrFe_{12}O_{19}$. As shown in FIGS. 4 and 5, the isoelectric points of $BaFe_{12}O_{19}$ and $SrFe_{12}O_{19}$ are about 4.5 and 6.1, respectively.

Example 2: Co-Assembly of Two Nanoparticles with Salt

A clean glass slide is submerged into a 1 wt % solution of 3-(trimethoxysilyl)propyl-N,N,N-trimethylammonium chloride in 95:5 ethanol:water (wt:wt) for 5-10 min to create a positively charged substrate, and then heated at 100° C. for 10 minutes. The charged substrate is next left to bind in a 0.25 wt % solution of $M_w$ 760,000 g/mol carboxymethyl cellulose at pH 6.5 for 1-2 hours and then washed with deionized water. Finally, a 1:1 wt:wt suspension of 34 mg of $BaFe_{12}O_{19}$ and $SrFe_{12}O_{19}$ nanoparticles (both <100 nm in diameter) is made with 10 mL of 100 mM of NaCl, and suspension pH is adjusted to 5.0. At this pH, from results obtained in Example 1, the $BaFe_{12}O_{19}$ is negatively charged while $SrFe_{12}O_{19}$ is positively charged.

Figure 6:
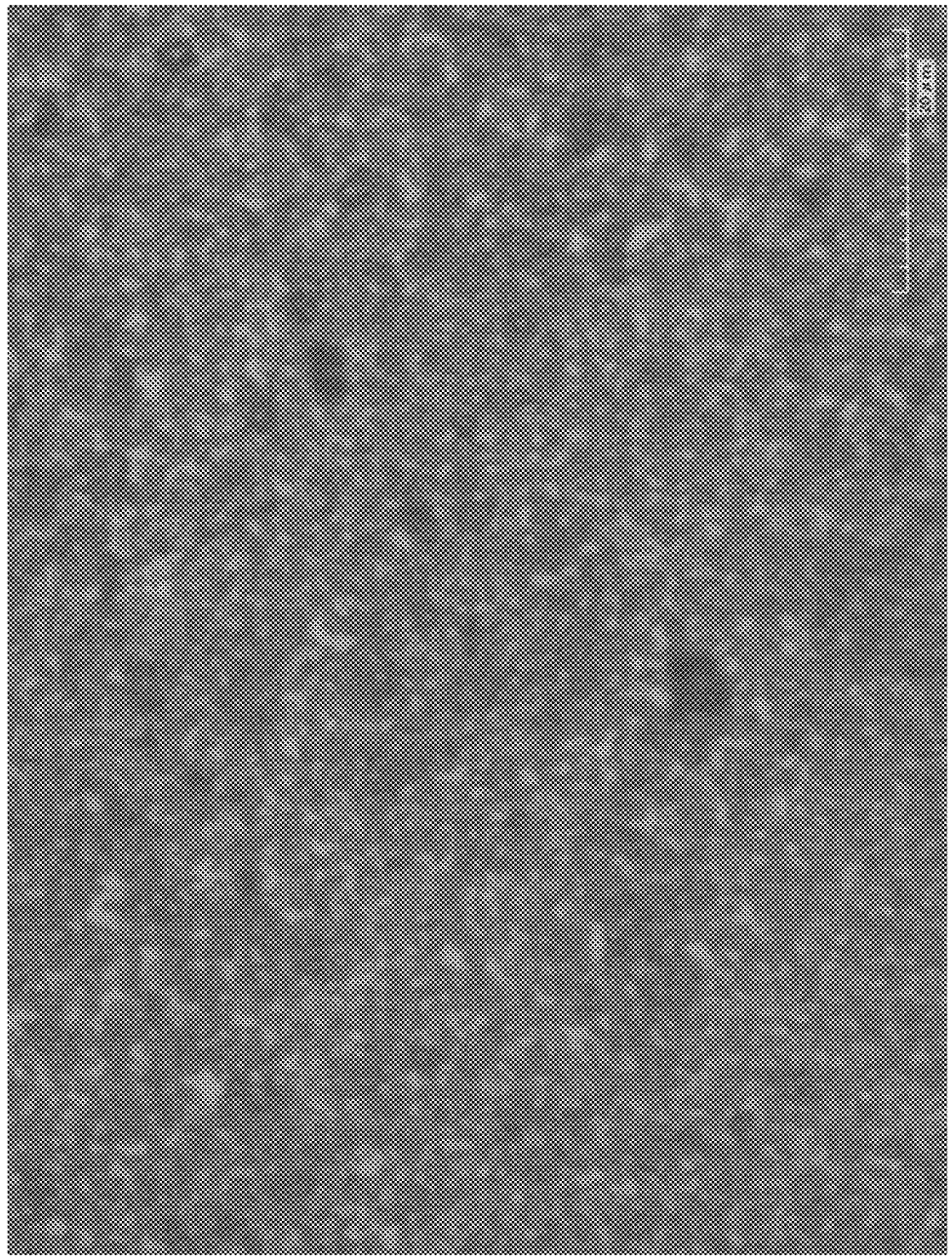
FIG. 6 shows an optical microscope image of assembled $SrFe_{12}O_{19}$ and $BaFe_{12}O_{19}$ nanoparticles onto a glass substrate, in Example 2.

The polymer-coated glass, rinsed in water, is dipped into the mixed nanoparticle suspension for 30 min-2 hours. The resulting binding of assembled $BaFe_{12}O_{19}/SrFe_{12}O_{19}$ nanoparticles is shown in the optical microscope image of FIG. 6. The scale bar shown is 20 microns. The salt helps screen charges and reduces repulsion between the particles, resulting in a higher binding density than a solution with no salt (see Example 8). A contact profilometer measurement reveals a thickness of approximately 400 nm.

Example 3: Co-Assembly with Magnetic Field

A polymer-coated slide, prepared in the same method as Example 2, was placed in a vial with a 1:1 $BaFe_{12}O_{19}$ and $SrFe_{12}O_{19}$ solution at pH=5. 100 mM NaCl is added. The vial is placed over a permanent N42 neodymium iron boron magnet for 2 hours and is shaken four times during that time period. An external magnetic field is applied using a permanent magnet featuring out-of-plane remanent magnetization. The resulting magnetic film has higher packing density than that of a magnetic film deposited without the magnetic field. Note that packing densities (by nitrogen absorption or mercury intrusion measurements) are preferably at least about 50 vol %, more preferably at least about 60 vol %, even more preferably at least about 70 vol %, such as about 70-80 vol %.

Example 4: Co-Assembly and Patterned Assembly

A clean glass slide is submerged into a 1 wt % solution of 3-(trimethoxysilyl)propyl-N,N,N-trimethylammonium chloride in 95:5 ethanol:water (wt:wt) for 5-10 min to create a positively charged substrate and then heated at 100° C. for 10 minutes. The charged substrate is next left to bind in a 0.25 wt % solution of $M_w$ 760,000 g/mol carboxymethyl cellulose at pH 6.5 for 1-2 hours. The substrate is rinsed in water and spin-dried.

Next, a silicon-based shadow mask (fabricated using conventional dry etching techniques) is placed directly in contact with the glass slide. The substrate with shadow mask is then placed into a UV/ozone cleaner for 30 minutes to clear the open areas from any polymeric material. The shadow mask is removed, and the substrate is then dipped in a 1:1 wt:wt suspension of $BaFe_{12}O_{19}$ and $SrFe_{12}O_{19}$ nanoparticles (both <100 nm in diameter), pH adjusted to 5.0, for 30 min-2 hours.

Figure 7:
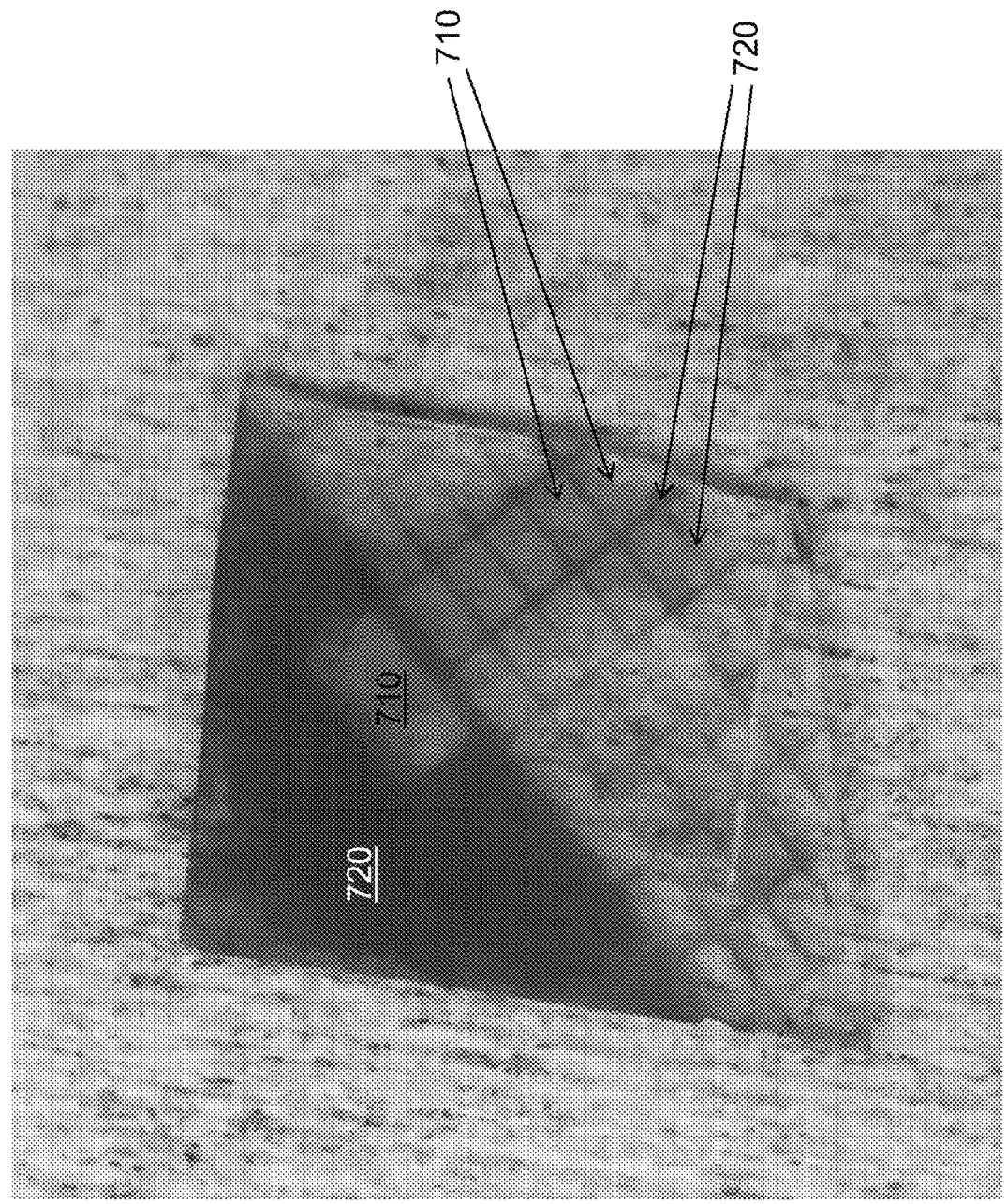
FIG. 7 shows a photograph of patterned co-assembly of $SrFe_{12}O_{19}$ and $BaFe_{12}O_{19}$ nanoparticles, in Example 4.

The resulting patterned co-assembly 700 of $BaFe_{12}O_{19}$ and $SrFe_{12}O_{19}$ is shown in FIG. 7. In regions 710 where the substrate is exposed to the UV/ozone cleaner, no (or minimal) deposition of the magnetic film is observed. High-density magnetic films are deposited in the remaining areas 720, indicating patternability of the magnetic film on substrates with feature sizes of 0.1 micron or higher.

Example 5: Co-Assembly at pH 4.4 and 5.5

Two polymer-coated glass slides, prepared in the same way as Example 2, are submerged into two different 1:1 wt:wt $BaFe_{12}O_{19}$ and $SrFe_{12}O_{19}$ solutions. One solution is adjusted to pH 4.4 near the isoelectric point of $BaFe_{12}O_{19}$, and one solution is adjusted to pH 5.5, closer to the isoelectric point of $SrFe_{12}O_{19}$. X-ray diffraction of the final materials shows the depositions at pH 4.4 and pH 5.5 are primarily composed of $BaFe_{12}O_{19}$ and $SrFe_{12}O_{19}$, respectively. However, the co-assembled substrates are of higher density than when done at similar pH and only one type of nanoparticle (see Example 9).

Example 6: Multi-Layer Assembly of Nanoparticles

A polymer-coated glass slide is prepared in the same way as Example 2. The substrate is submerged in a 1:1 wt:wt $BaFe_{12}O_{19}$ and $SrFe_{12}O_{19}$ solution mixture at pH 5 for 30 min and dried. The polymer-nanoparticle layer is considered one layer. Next, the substrate with the one layer is placed back into a solution of carboxymethyl cellulose for 30 min, and then a fresh 1:1 wt:wt $BaFe_{12}O_{19}$ and $SrFe_{12}O_{19}$ solution is added at the same pH and for the same duration of time. This same sequence is repeated a third time. The resulting $BaFe_{12}O_{19}/SrFe_{12}O_{19}$ nanoparticle film is darker than a single polymer-nanoparticle layer (one-layer deposition). Contact profilometry shows a 1.2 μm thickness in the assembled magnetic layer.

Example 7: Multi-Layer Assembly on Wafer Scale

A fused silica 3" wafer is spin-coated with a negative lift-off resist and baked at 100° C. for 2 minutes. A chromium mask is used to expose parts of the resist to a 365 nm wavelength for 12 seconds. The wafer is baked at 100° C. for another 2 minutes before the resist is developed to remove the unexposed regions. Next, that wafer is submerged for 5 min into a 1% solution of 3-(trimethoxysilyl)propyl-N,N,N-trimethylammonium chloride in water that had been adjusted to pH 5. The silane polymer is baked onto the wafer at 120° C. for 20 minutes.

Figure 8B:
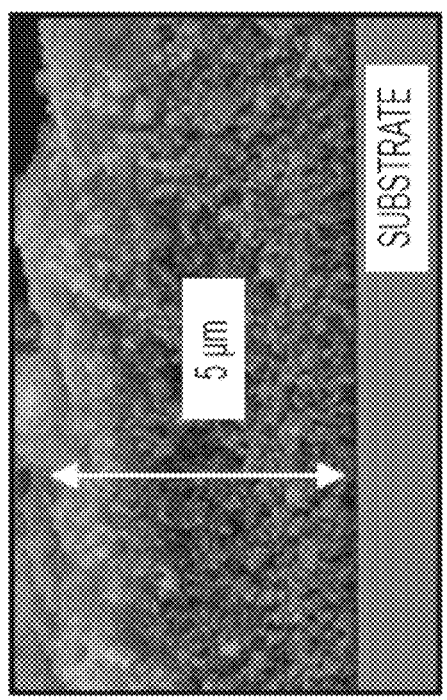
FIG. 8B shows a zoomed-in portion (side view) of the assembly of FIG. 8A with 5-micron depth, in Example 7.
Figure 8A:
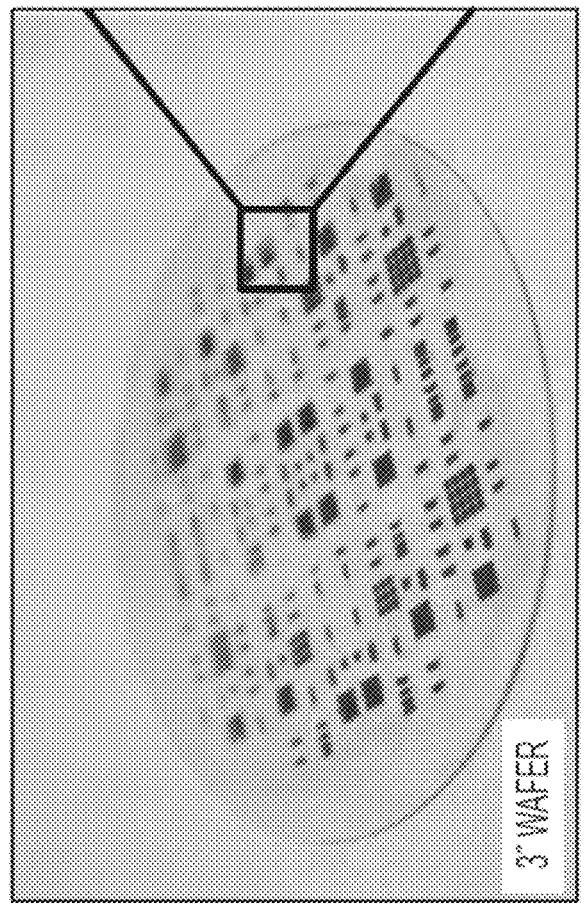
FIG. 8A shows an image of six-layer deposition of $SrFe_{12}O_{19}$ and $BaFe_{12}O_{19}$ nanoparticles onto a fused-silica wafer, in Example 7.

Next, multiple layers of carboxymethyl cellulose (CMC) and 1:1 wt:wt $BaFe_{12}O_{19}$ and $SrFe_{12}O_{19}$ solution are deposited onto the wafer, in the same manner as Example 6 except that the CMC step is shortened to 5 min (from 30 min), as a prolonged soak in the polymer might lift off the resist mask. Finally, after six layers are completed, the wafer is submerged into a bath of acetone to lift-off the resist, revealing a uniform patterned wafer (see FIG. 8A). A cross-sectional image of the deposited film of FIG. 8A is shown as an inset, FIG. 8B. Many more layers may be deposited, such as 10, 20, 30, 40, 50, 60, 70, 80, 90, 100 layers or more. A sequential dip process run by a robot could be employed, for example.

Example 8: Co-Assembly of Two Particles Without Salt

Figure 9:
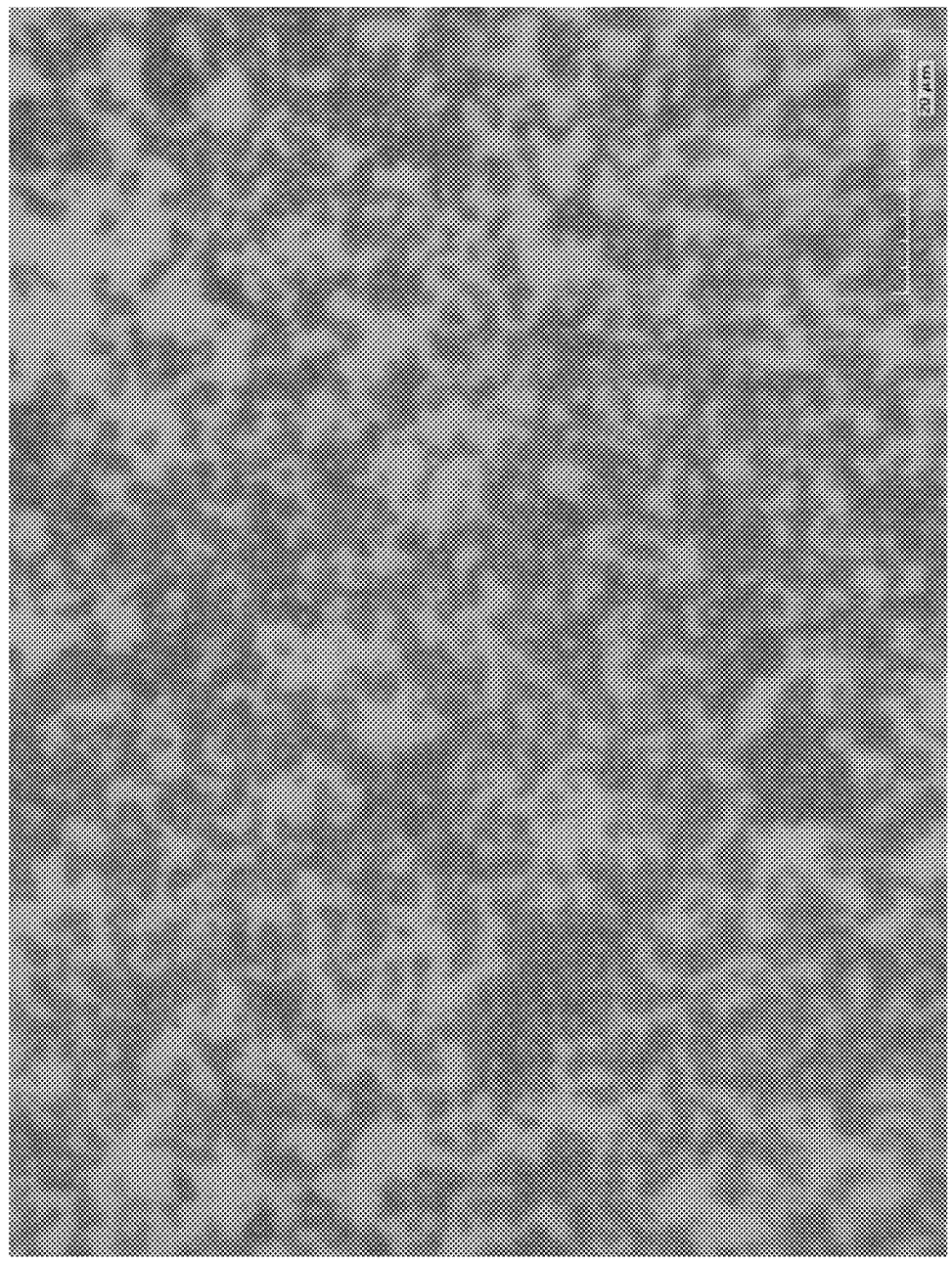
FIG. 9 shows an optical microscope image of assembled $SrFe_{12}O_{19}$ and $BaFe_{12}O_{19}$ nanoparticles onto glass substrate, in Example 8.

A sample is prepared the same as in Example 2, with no NaCl concentration, to generate assembled $BaFe_{12}O_{19}$/$SrFe_{12}O_{19}$ nanoparticles onto glass slide. The resulting optical microscope image is shown in FIG. 9. Compared to FIG. 6, the packing density of the $BaFe_{12}O_{19}$/$SrFe_{12}O_{19}$ nanoparticle layer appears to be lower. There are voids with length scales of about 1-2 microns in FIG. 6, while in FIG. 9, there are voids with length scales of about 5-10 microns and larger.

Example 9: Assembly of Only $BaFe_{12}O_{19}$ and $SrFe_{12}O_{19}$.

Two polymer-coated substrates are prepared in the same method as Example 2. One substrate is submerged in a solution of $BaFe_{12}O_{19}$ at pH 3.5, and the other substrate is submerged in a solution of $SrFe_{12}O_{19}$ at pH 5.0. Optical microscopy (not shown) indicates sparser coverage in both substrates, compared to Example 5.

The structures provided herein are useful in a wide variety of applications, including but not limited to drive motors, windshield wiper motors, starter motors, commercial aircraft pumps and actuators, magnets, electronic devices, electrochemical systems, computers, controlled wetting and anti-reflective coatings, optical scattering surfaces, diffractive coatings, and cameras. Integrated magnetic components can be provided, such as micron-thick magnetic thin films from nanoparticles, which are difficult to achieve with top-down fabrication.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. A method of depositing nanoparticles on a substrate, said method comprising:
    (a) providing or preparing a starting substrate having a positive or negative surface charge;
    (b) depositing a polymer on said starting substrate, wherein said polymer has opposite charge polarity compared to said starting substrate, thereby generating a polymer-coated substrate;
    (c) providing first nanoparticles and second nanoparticles suspended in a liquid solution, wherein said first nanoparticles and said second nanoparticles have the same charge polarities, and wherein a salt is included in said liquid solution, wherein said salt screens charges of said first nanoparticles and/or said second nanoparticles;
    (d) adjusting the pH of said liquid solution such that the charge polarity of said first nanoparticles switches to the opposite charge polarity; and
    (e) simultaneously depositing said first nanoparticles and said second nanoparticles onto said polymer-coated substrate, wherein said first nanoparticles and said second nanoparticles have opposite charge polarities during said depositing,
    wherein said first nanoparticles and said second nanoparticles are faceted and hexagonally shaped nanoparticles that are collectively characterized by less than 25% size variation,
    and wherein said first nanoparticles and said second nanoparticles form a layer on said polymer-coated substrate, wherein said layer has a layer packing density of at least 50 vol %.

2. The method of claim 1, wherein said polymer-coated substrate is prepared to have said positive or negative surface charge by applying, to said starting substrate, one or more compounds selected from the group consisting of thiols, silanes, alkoxysilanes, and phosphonic acids.

3. The method of claim 1, wherein said polymer-coated substrate contains, on its surface, a functional group selected from the group consisting of amine, imine, ammonium, carboxylate, sulfate, phosphate, and combinations thereof.

4. The method of claim 1, wherein said polymer contains a functional group selected from the group consisting of amine, imine, ammonium, carboxylate, sulfate, phosphate, and combinations thereof.

5. The method of claim 1, wherein said polymer is selected from the group consisting of poly(acrylic acid), poly(quarternary ammonium salts), poly(alkyl amines), poly(alkyl carboxylic acids) including copolymers of maleic anhydride or itaconic acid, poly(ethylene imine), poly(propylene imine), poly(vinylimidazoline), poly(trialkylvinyl benzyl ammonium salt), heparin, dextran sulfate, λ-carrageenan, pentosan polysulfate, mannan sulfate, chondroitin sulfate, poly(carboxymethylcellulose), poly(D-lysine), poly(L-lysine), poly(L-glutamic acid), poly(L-aspartic acid), poly(γ-glutamic acid), and combinations thereof.

6. The method of claim 1, wherein said first nanoparticles are different chemically from said second nanoparticles.

7. The method of claim 1, wherein said first nanoparticles, said second nanoparticles, or both of said first and second nanoparticles are magnetic nanoparticles.

8. The method of claim 7, wherein said magnetic nanoparticles are selected from the group consisting of $Fe_3O_4$, $BaFe_{12}O_{19}$, $SrFe_{12}O_{19}$, $CoFe_2O_4$, $Mn_xZn_{(1-x)}Fe_2O_4$, $Ni_xZn_{(1-x)}Fe_2O_4$, and combinations thereof (x is from 0 to 1).

9. The method of claim 1, wherein a magnetic field is applied during said method of depositing nanoparticles on a substrate.

10. The method of claim 9, wherein said magnetic field is created with a permanent magnet, an electromagnet, or a combination thereof.

11. The method of claim 1, wherein said layer has a thickness from about 100 nanometers to about 10 microns.

12. The method of claim 1, said method further comprising creating a pattern of said first nanoparticles and said second nanoparticles on said polymer-coated substrate.

13. The method of claim 1, wherein said layer has a layer packing density of at least 90 vol %.

14. The method of claim 1, wherein said polymer-coated substrate has a surface charge that is more uniform compared to surface charge of said starting substrate.

\* \* \* \* \*